United States Patent
Ayuzawa et al.

(10) Patent No.: US 11,667,789 B2
(45) Date of Patent: Jun. 6, 2023

(54) POLYAMIDE RESIN COMPOSITION AND POLYAMIDE RESIN MOLDED ARTICLE

(71) Applicant: TOYOBO CO., LTD., Osaka (JP)

(72) Inventors: Yoshitaka Ayuzawa, Shiga (JP); Kensaku Maeda, Shiga (JP); Ryo Umeki, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/640,973

(22) PCT Filed: Sep. 9, 2020

(86) PCT No.: PCT/JP2020/034062
§ 371 (c)(1),
(2) Date: Mar. 7, 2022

(87) PCT Pub. No.: WO2021/049511
PCT Pub. Date: Mar. 18, 2021

(65) Prior Publication Data
US 2022/0267597 A1 Aug. 25, 2022

(30) Foreign Application Priority Data
Sep. 12, 2019 (JP) .............................. JP2019-166127

(51) Int. Cl.
*C08L 77/00* (2006.01)
(52) U.S. Cl.
CPC ........... *C08L 77/00* (2013.01); *C08L 2205/03* (2013.01)
(58) Field of Classification Search
CPC ........... C08L 2205/03; C08L 2207/062; C08L 51/003; C08L 51/006; C08L 51/04; C08L 51/06; C08L 53/02; C08L 23/26
See application file for complete search history.

(56) References Cited

U.S. PATENT DOCUMENTS

| | | | |
|---|---|---|---|
| 4,174,358 | A | 11/1979 | Epstein |
| 5,583,177 | A | 12/1996 | Kinoshita et al. |
| 2004/0102560 | A1 | 5/2004 | Nozaki |
| 2006/0111500 | A1 | 5/2006 | Harada et al. |
| 2008/0073620 | A1 | 3/2008 | Taniguchi et al. |
| 2009/0130417 | A1 | 5/2009 | Maeda et al. |

FOREIGN PATENT DOCUMENTS

| | | | |
|---|---|---|---|
| CN | 109651809 | | 4/2019 |
| CN | 109651809 A | * | 4/2019 |
| CN | 110079080 | | 8/2019 |
| JP | 51-143061 | | 12/1976 |
| JP | 6-345961 | | 12/1994 |
| JP | 7-82476 | | 3/1995 |
| JP | 8-157714 | | 6/1996 |
| JP | 2001-106904 | | 4/2001 |
| JP | 3417600 | | 4/2003 |
| JP | 2006-143964 | | 6/2006 |
| JP | 2009-120773 | | 6/2009 |
| JP | 2018-177874 | | 11/2018 |
| WO | 01/09246 | | 2/2001 |
| WO | 2006/035619 | | 4/2006 |
| WO | 2019/059357 | | 3/2019 |

OTHER PUBLICATIONS

International Search Report dated Nov. 2, 2020 in International (PCT) Application No. PCT/JP2020/034062.
Office Action dated Feb. 22, 2021 in corresponding Japanese Application No. 2020-566852, with English translation.
Decision to Grant a Patent dated Jun. 1, 2021 in corresponding Japanese Application No. 2020-566852, with English translation.
International Preliminary Report on Patentability dated Mar. 15, 2022 in corresponding International (PCT) Patent Application No. PCT/JP2020/034062.
Office Action dated May 25, 2022 in corresponding Chinese Patent Application No. 202080056571.0, with English language translation.
Office Action dated May 2, 2022 in corresponding Indian Patent Application No. 202247020144.
Office Action dated Nov. 15, 2022 in corresponding Chinese Patent Application No. 202080056571.0, with English translation, 12 pages.
Office Action dated Feb. 24, 2023 in corresponding Chinese Patent Application No. 202080056571.0, with English translation, 12 pages.

* cited by examiner

*Primary Examiner* — Ana L. Woodward
(74) *Attorney, Agent, or Firm* — Wenderoth, Lind & Ponack, L.L.P.

(57) ABSTRACT

A polyamide resin composition containing a polyimide resin (A), a modified styrene-based copolymer (B), a modified high-density polyethylene (C), and an aliphatic metal salt (D), and having a melt mass flow rate (MFR) of 20 g/10 minutes or more and less than 60 g/10 minutes and a 65% RH equilibrium water absorption rate of less than 3%. The polyamide resin composition can form a molded article having a sufficiently high limit of fatigue against continuous load, achieve high mechanical characteristics and high fluidity to prevent the occurrence of a short shot or decrease in the strength of a welded part even in a large and/or thick molded article, and has excellent mold releasability and more excellent abrasion resistance than ever before.

5 Claims, No Drawings

POLYAMIDE RESIN COMPOSITION AND POLYAMIDE RESIN MOLDED ARTICLE

TECHNICAL FIELD

The present invention relates to a polyamide resin composition, and more specifically, a polyamide resin composition for forming a polyamide resin molded article (for example, a sliding component and the like) having a low sliding friction coefficient, a low abrasion loss due to the surface roughness, and a small deterioration in performance due to repeated fatigue. The polyamide resin composition of the present invention is particularly suitable for mechanical components such as door checkers and gears for automobiles which require sliding characteristics.

BACKGROUND ART

Polyamide resins have excellent mechanical characteristics and excellent abrasion resistance, and therefore, they have been widely used as a sliding components such as gears, cams and bearings. The plastic materials employed for this kind of application are required to meet the following conditions:
1) They have a low sliding friction coefficient.
2) They have a low abrasion loss due to the surface roughness (Taber abrasion loss).
3) They have excellent mechanical characteristics, e.g., high limit of fatigue against continuous load such as repeated fatigue.
4) They have a high softening temperature.
5) They can easily be molded into various parts.

However, conventional polyamide resins exhibit the above characteristics only to an unsatisfactory extent; in particular, the abrasion loss due to the surface roughness cannot be decreased, and the limit of fatigue against continuous load such as repeated fatigue is insufficient.

For this reason, commercially available polyamide resin compositions usually contain various kinds of additives such as Teflon (registered trademark) resins, silicone oil, mineral oils or high-density polyethylenes for the purpose of decreasing the friction coefficient thereof. These additives have no compatibility with polyamide resins or they exhibit no interfacial adhesion to the polyamide resins; therefore, these polyamide resin compositions still have a high abrasion loss due to the surface roughness and an insufficient limit of fatigue against continuous load such as repeated fatigue.

As another polyamide resin composition, a polyamide resin composition which is obtained by adding a mixture of ethylene/propylene/1,4-hexadiene and ethylene/maleic anhydride to a polyamide resin has been proposed (Patent Document 1). With the use of this polyamide resin composition, it is possible to obtain molded articles having an improved impact resistance, which leads to a slightly improved limit of fatigue against continuous load such as repeated fatigue; however, the abrasion loss due to the surface roughness cannot be decreased.

Meanwhile, the addition of an acid-modified styrene-based copolymer and an acid-modified high-density polyethylene to a polyamide resin has been proposed to provide a polyamide resin composition having a high limit of fatigue against continuous load and a significantly improved sliding friction coefficient and abrasion loss due to the surface roughness (Patent Document 2). However, while sliding components are enlarged and complicated components such as having both thickened and thinned parts are required to be molded, conventional materials have low fluidity, which disadvantageously causes a short shot. during molding, or decrease in the strength of a welded part. Meanwhile, if a low-viscosity resin is used to increase the fluidity, the strength, stiffness, and impact strength of the sliding components are lowered, whereby a material having these characteristics is required. When the molded article becomes large, the polyamide resin composition containing the styrene-based copolymer and the high-density polyethylene remarkably causes the following mold release defect: the polyamide resin composition sticks to a mold during molding and does not peel off.

PRIOR ART DOCUMENTS

Patent Document

Patent Document 1: JP-A-S51-143061
Patent Document 2: JP-E-3417600

DISCLOSURE OF THE INVENTION

Problems to be Solved by the Invention

An object of the present invention is to provide a polyamide resin composition which can form a molded article having a sufficiently high limit of fatigue against continuous load such as repeated fatigue, achieves both high mechanical characteristics and high fluidity to prevent the occurrence of a short shot or decrease in the strength of a welded part even in a large and/or thick molded article, and has excellent mold releasability and more excellent abrasion resistance than ever before.

SUMMARY OF THE INVENTION

Thus, the present invention comprises the following constitutions.

[1] A polyamide resin composition comprising 3 to 10 parts by mass of a modified styrene-based copolymer (B), 0.5 to 5 parts by mass of a modified high-density polyethylene (C), and 0.05 to 2 parts by mass of an aliphatic metal salt (D) with respect to 100 parts by mass of a polyamide resin (A), and having a melt mass flow rate (MFR) of 20 g/10 minutes or more and less than 60 g/10 minutes and a 65% RH equilibrium water absorption rate of less than 3%.

[2] The polyamide resin composition according to (1), wherein an equivalent concentration A (meq/kg) of a carboxy group of the polyamide resin (A) in the polyamide resin composition and an equivalent concentration Z (meq/kg) of a metal ion derived from the aliphatic metal salt (D) in the polyamide resin composition satisfy the following formula (1).

$$1.5 \leq A/Z \leq 55 \tag{1}$$

[3] The polyamide resin composition according to [1] or (2), wherein the polyamide resin (A) contains at least polyamide 66.

[4] The polyamide resin composition according to any one of [1] to [3], wherein
the modified styrene-based copolymer (B) is a modified styrene-based copolymer modified with an unsaturated carboxylic acid and/or an unsaturated dicarboxylic acid anhydride, and the modified high-density polyethylene (C) is a modified high-density polyethylene modified with an unsaturated carboxylic acid and/or an unsaturated dicarboxylic acid anhydride.

[5] A polyamide resin molded article obtained from the polyamide resin composition according to any one of [1] to [4].

EFFECT OF THE INVENTION

The polyamide resin composition of the present invention contains the modified styrene-based copolymer (B) and the modified high-density polyethylene (C), whereby a molded article having a sufficiently high limit of fatigue against continuous load such as repeated fatigue can be obtained. The polyamide resin composition of the present invention has a melt mass flow rate (MFR) of 20 g/10 minutes or more and less than 60 g/10 minutes, and a 65% RH equilibrium water absorption rate of less than 3%, whereby the polyamide resin composition can achieve both high fluidity and high mechanical characteristics, and has more excellent abrasion resistance than ever before. Furthermore, the polyamide resin composition of the present invention contains the aliphatic metal salt (D), whereby the polyamide resin composition has excellent mold releasability.

MODE FOR CARRYING OUT THE INVENTION

Hereinafter, the present invention will be described in detail.

With regard to the polyamide resin (A), there is no particular limitation so far as they are polymers having an amide bond (—NHCO—) in the main chain and exhibit crystallinity. Examples thereof include crystalline polyamide resin such as Nylon 6 (NY6), Nylon 66 (NY66), Nylon 46 (NY46), Nylon 11 (NY11), Nylon 12 (NY12), Nylon 610 (NY610), Nylon 612 (NY612), poly(m-xylylene adipamide) (MXD6), hexamethylenediamine-terephthalic acid polymer (6T), hexamethylenediamine-terephthalic acid and adipic acid polymer (66T), hexamethylenediamine-terephthalic acid and ε-caprolactam copolymer (6T/6), trimethylhexamethylenediamine-terephthalic acid polymer (TMD-T), m-xylylenediamine with adipic acid and isophthalic acid polymer (MXD-6/I), trihexamethylenediamine with terephthalic acid and ε-caprolactam copolymer (TMD-T/6) and diaminodicyclohexylenemethane (CA) with isophthalic acid and lauryllactam polymer. These resins may be non-limitative and used alone or in combination.

The polyamide resin (A) is particularly preferably nylon 66. The relative viscosity (RV) of the polyamide resin (A) is particularly important. Generally, the relative viscosity of a polyamide resin is measured by measuring methods using three types of solvents: metacresol; 96% sulfuric acid; and 90% formic acid depending on the type of a solvent for dissolving. The relative viscosity of the polyamide resin (A) in the present invention is measured in a 98% sulfuric acid solution (polyamide resin concentration: 1 g/dl, temperature: 25° C.), preferably 2.1 to 3.4, and more preferably 2.3 to 3.1.

The content of the polyamide resin (A) in the polyamide resin composition is not particularly limited, but is preferably 85 to 95% by mass.

The polyamide resin composition of the present invention contains a modified styrene-based copolymer (B) and a modified high-density polyethylene (C) as essential constituents in addition to the polyamide resin (A). These constituents contribute to the improvement of frictional characteristics and fatigue limit.

The styrene-based copolymer before modification in the present invention may be any conventional styrene block copolymer of the S(styrene)-B(butadiene)-S(styrene) type, having a symmetric block structure, wherein the letters S and B refer to a polymer block respectively. The center block B is preferably composed of polybutadiene, although it may be replaced by polyisoprene. Also recommended are hydrogenated styrene block copolymers (SEBS) in which some double-bond portions of polybutadiene are changed into saturated alkyl groups (i.e., ethylene chains) by hydrogenation. The end block S refers to a polymer block of aromatic hydrocarbons, and is preferably composed of polystyrene. There may be specifically exemplified a styrene-type thermoplastic elastomer such as a block copolymer of styrene/butadiene/styrene (SBS), a block copolymer of styrene/isoprene/styrene (SIS), a block copolymer of styrene/ethylene-butylene/styrene (SEBS), a block copolymer of styrene/ethylene-propylene/styrene (SEPS), and a block copolymer of styrene/ethylene-amylene/styrene (vinyl SEPS). Among the styrene-based thermoplastic elastomers, the particularly preferred one is SEBS. The molecular weight of the end block S is preferably in the range of 4000 to 115,000, more preferably 5000 to 15,000. The molecular weight of the center block B is preferably in the range of 20,000 to 450,000, more preferably 25,000 to 100,000.

The high-density polyethylene before modification in the present invention means a high-density polyethylene having a density of 0.94 g/cm$^3$ or more. The weight average molecular weight of the high-density polyethylene is not particularly limited, but is preferably 50,000 to 400,000, and more preferably 60,000 to 380,000. When the weight average molecular weight is within the above range, the abrasion resistance and moldability of the obtained molded article are improved. When an MFR is used as an index of the molecular weight, the MFR measured at 190° C. and 21.2 N based on JIS K7210 is preferably 0.05 to 50 g/10 minutes, and more preferably 0.2 to 20 g/10 minutes. The high-density polyethylene used in the present invention may contain at least one additional copolymerizable monomers within the limits of not deteriorating the properties thereof, examples of which are α-olefins such as propylene, 1-butene, pentene, 4-methyl-1-pentene, hexene, octene and decene; dienes such as butadiene and isoprene; cycloolefins such as cyclopentene, cyclohexene and cyclopentadiene; and acrylates such as methyl acrylate, ethyl acrylate and butyl acrylate.

The modified styrene-based copolymer (B) and the modified high-density polyethylene (C) have a reactive functional group capable of reacting with a terminal group (amino group or carboxy group) of the polyamide resin (A) and/or a main chain amide group in order to improve compatibility with the polyamide resin (A). Examples of the reactive functional group include a carboxy group, an acid anhydride group, an epoxy group, an oxazoline group, an amino group, and an isocyanate group.

From the viewpoint of high reactivity with the polyamide resin (A), the modified styrene-based copolymer (B) is preferably a modified styrene-based copolymer modified with an unsaturated carboxylic acid and/or an unsaturated dicarboxylic acid anhydride, and the modified high-density polyethylene (C) is preferably a modified high-density polyethylene modified with an unsaturated carboxylic acid and/or an unsaturated dicarboxylic acid anhydride.

Examples of unsaturated carboxylic acids or unsaturated dicarboxylic acid anhydrides include unsaturated carboxylic acids, such as acrylic acid, methacrylic acid, crotonic acid and oleic acid, and unsaturated dicarboxylic acid anhydrides, such as maleic anhydride, itaconic anhydride and citraconic anhydride. These modifiers may be used alone or in combination. Particularly preferred is maleic anhydride.

The modification reaction of a styrene-based copolymer or high-density polyethylene with an unsaturated carboxylic acid and/or unsaturated dicarboxylic acid anhydride can be effected by mixing the styrene-based copolymer or high-density polyethylene and the unsaturated carboxylic acid and/or unsaturated dicarboxylic acid anhydride in the presence of a peroxide for radical formation, and then kneading this mixture in an extruder or a mixer at 100 to 250° C. for 1 to 10 minutes. The amount of unsaturated carboxylic acid and/or unsaturated dicarboxylic acid anhydride to be used is preferably in the range of 0.1 to 5 parts by mass with respect to 100 parts by mass of the styrene-based copolymer or 100 parts by mass of the high-density polyethylene.

The modified styrene-based copolymer (B) is blended in an amount of 3 to 10 parts by mass, preferably 3.5 to 9 parts by mass, more preferably 5 to 8 parts by mass, based on 100 parts by mass of the polyamide resin (A). If the amount is less than 3 parts by mass, no improvement in the repeated fatigue characteristics can be attained. If the amount exceeds 10 parts by mass, the resulting molded articles have a high abrasion loss due to the surface roughness.

The modified high-density polyethylene (C) is blended in an amount of 0.5 to 5 parts by mass, preferably 0.7 to 4.5 parts by mass, more preferably 0.7 to 3 parts by mass, based on 100 parts by mass of the polyamide resin (A). If the amount is less than 0.5 parts by mass, the resulting molded articles have an insufficient resistance to abrasion. If the amount exceeds 5 parts by mass, the resulting molded articles exhibit a deterioration of mechanical properties such as stiffness and a decrease in the heat resistance.

The polyamide resin composition of the present invention contains an aliphatic metal salt (D) in order to improve mold releasability. Examples of a metal element forming a salt with a fatty acid of the aliphatic metal salt (D) include a group 1 element (alkali metal), a group 2 element (alkali earth metal), and a group 3 element in the element periodic table, zinc, and aluminum. As the metal element, alkali metals such as sodium and potassium, alkaline earth metals such as calcium and magnesium, and aluminum are preferable.

The aliphatic metal salt (D) is not particularly limited, and examples thereof include higher fatty acid salts such as calcium stearate, aluminum stearate, zinc stearate, magnesium stearate, calcium montanate, sodium montanate, aluminum montanate, zinc montanate, magnesium montanate, calcium behenate, sodium behenate, zinc behenate, calcium laurate, zinc laurate, and calcium palmitate. Here, the higher fatty acid is a fatty acid having more than 10 carbon atoms.

As the aliphatic metal salt (D), a montanic acid metal salt, a behenic acid metal salt, and a stearic acid metal salt are suitably used. Calcium stearate, aluminum stearate, zinc stearate, magnesium stearate, calcium montanate, zinc montanate, magnesium montanate, calcium behate, and zinc behenate are preferable. Aluminum stearate, zinc stearate, magnesium stearate, calcium montanate, zinc montanate, calcium behenate, and zinc behenate are more preferable. Magnesium stearate, calcium montanate, zinc montanate, and zinc behenate are still more preferable. These may be used alone or in combination of two or more.

The aliphatic metal salt (D) is blended in an amount of 0.05 to 2 parts by mass, preferably 0.1 to 1.5 parts by mass, and more preferably 0.5 to 1.5 parts by mass with respect to 100 parts by mass of the polyamide resin (A). If the amount is less than 0.05 parts by mass, good screw biting stability cannot be obtained, and problems tend to occur in mold releasability. If the amount exceeds 2 parts by mass, appearance defects due to volatile components during molding tend occur, and the interaction between a carboxy group of the modified styrene-based copolymer (B) and/or the modified high-density polyethylene (C) and the polyamide resin (A) is inhibited, whereby the mechanical characteristics such as impact resistance of the polyamide resin composition are deteriorated, and the variation in the melt mass flow rate (MFR) is increased.

For the purpose of further improving sliding characteristics (i.e., frictional and abrasional characteristics) of polyamide resin molded articles, the polyamide resin composition of the present invention may contain, in addition to the above four essential ingredients, various additives such as carbon fibers, powdered fluorocarbon resins, molybdenum disulfide and glass beads. However, wollastonite is not blended because the wollastonite present on the surface of the molded article wears a mating material during sliding.

For the purpose of improving the mechanical properties and electrical properties of the polyamide resin molded articles, the polyamide resin composition of the present invention may contain fillers such as calcium carbonate and barium sulfate; and electrical conductivity-improving fillers such as whiskers of potassium titanate, carbon black and metal powders within the limits of not deteriorating the sliding characteristics of the polyamide resin molded articles. Further, the polyamide resin composition of the present invention may contain additional additives such as inhibitors against any deterioration by oxygen, heat, ultraviolet ray or the like, stabilizers, lubricants, plasticizers, flame-retardants, antistatic agents, colorants and mold release agents within the limits of not deteriorating the sliding characteristics of the polyamide resin molded articles.

The polyamide resin composition of the present invention can be prepared by kneading the above ingredients together in an apparatus such as a single-screw extruder, twin-screw extruder, kneader or double roller. The kind of kneading apparatus and kneading conditions to be employed are not particularly limited.

The polyamide resin composition of the present invention has a melt mass flow rate (MFR) of 20 g/10 minutes or more and less than 60 g/10 minutes measured at a water content of 0.05% or less, a melting point+10° C. as a measuring temperature, and a load of 2.16 kg, and a 65% RH equilibrium water absorption rate of less than 3%. If these are within the above ranges, moldability and abrasion resistance are excellent. If the MFR is less than 20 g/10 minutes, the fluidity is insufficient, which causes a short shot or decrease in the strength of a welded part of the molded article. If the MFR is 60 g/10 minutes or more, the mechanical characteristics are insufficient, which tends to cause deterioration in abrasion resistance. If the 65% RH equilibrium water absorption rate of the polyamide resin composition is 3% or more, the surface hardness is insufficient which tends to cause deterioration in friction resistance. The MER is preferably 24 g/10 minutes or more and 55/1.0 minutes or less. The 65% RH equilibrium water absorption rate is preferably 2.6% or less.

In the polyamide resin composition of the present invention, it is preferable that the equivalent concentration A (meq/kg) of the carboxy group of the polyamide resin (A) in the polyamide resin composition and the equivalent concentration Z (meq/kg) of a metal ion derived from the aliphatic metal salt (D) in the polyamide resin composition satisfy the following formula (1).

$$1.5 \leq A/Z \leq 55 \tag{1}$$

Here, the equivalent concentration A of the carboxy group is a value obtained by dissolving the polyamide resin composition in heavy benzene/HEIP-d, followed by centrifuging the solution and measuring the supernatant by $^1$H-NMR. The equivalent concentration Z of the metal ion derived from the aliphatic metal salt (D) can be calculated from the blending ratio of each component. The equivalent concentration of the metal ion is twice the concentration of the metal ion when the metal ion is divalent, and three times the concentration of the metal ion when the metal ion is trivalent.

When the polyamide resin composition satisfies the above formula (1), the polyamide resin composition has high fluidity during molding and excellent impact resistance and slidability while maintaining excellent mold releasability and mechanical characteristics. The A/Z is more preferably 2 or more and 50 or less.

The polyamide resin molded article of the present invention is obtained from the polyamide resin composition.

Examples

Hereinafter, the present invention will be specifically described with reference to Examples, but the present invention is not limited to these Examples. The physical characteristics of a polyamide resin molded article obtained in each of the following examples were measured based on the following test methods.

Raw materials used in Examples and Comparative Examples of the present invention are as follows.

As a polyamide resin (A), (A1) to (A5) were used.
(A1) Polyamide 66 (RV=2.0, melting point 261° C.)
(A2) Polyamide 66 (RV=2.7, melting point 265° C.)
(A3) Polyamide 66 (RV=3.5, melting point 265° C.)
(A4) Polyamide 6T/6 (RV=2.6, melting point 295° C.)
(A5) Polyamide 6 (RV=2.5, melting point 230° C.)

As a modified styrene-based copolymer (B), Tuftec M1943 (manufactured by Asahi Kasei Corporation, acid modification amount: 1.2% by mass) was used.

As a modified high-density polyethylene (C), Modic DH0200 (manufactured by Mitsubishi Chemical Corporation, acid modification amount: 0.5% by mass, MFR: 0.45 g/10 minutes)

As an aliphatic metal salt (D), (D1) and (D2) were used.
(D1) Magnesium stearate (manufactured by TANNAN KAGAKU KOGYO CO., LTD., NP-1500)
(D2) Calcium montanate (manufactured by Nitto Chemical Industry Co., Ltd., CS-6CP)

As other raw materials, the following raw material was used.

As an inorganic filler (E), wollastonite (manufactured by Kinsei Matec Co., Ltd., FPW800) was used.

Raw materials were weighed at blending ratios for the polyamide resin compositions shown in Tables 1 and 2, and mixed in a tumbler. The mixture was then charged into a twin-screw extruder. The set temperature of the twin-screw extruder is 250° C. to 300° C., and the kneading time is 5 to 10 minutes. Various evaluation samples were molded from the obtained pellets using an injection molding machine.

The equivalent concentration of a carboxy group of the polyamide resin (A) in the polyamide resin composition was calculated by the following measurement.

A sample was dissolved in heavy benzene/HFIP-d (temperature: 35° C., 1 hour), and the solution was then centrifuged. To the supernatant, 23 µl of 0.2 M triethylamine/CDCl$_3$ was added, followed by performing $^1$H-NMR measurement. The sample was cut out from the pellets. From the obtained $^1$H-NMR analysis, the amount of the carboxy group was calculated from CH$_2$ peak intensity at the a position of the carboxy group based on the weight of the polyamide resin (A), and the calculated value was then converted into a value with respect to the entire sample from a soluble content ratio.

[NMR Measurement]
Device: Fourier transform nuclear magnetic resonance device (AVANCE-NEO manufactured by Bruker)
1H resonance frequency: 600.13 MHz
Flip angle of detected pulse: 30°
Incorporation time of data: 4 seconds
Retardation time: 1 second
Cumulative calculation numbers: 64

The equivalent concentration of a metal ion derived from the aliphatic metal salt (D) in the polyamide resin composition was calculated from the blending ratio.

A melt mass flow rate (MYR) was measured by the following method.

The pellets of the polyamide resin composition were dried to a moisture content of 0.05 or less with a hot air dryer, and an amount of a resin flowing in 10 minutes under a load of 2160 g was measured according to JIS K 7210-1: 2014. Measured temperatures were 275° C. for Examples 1 to 8 and Comparative Examples 1, 2, and 4 to 9, 310° C. for Example 9, and 235° C. for Comparative Example 3. The measurement was performed 10 times to determine a standard deviation.

65% RH equilibrium water absorption rate: An equilibrium water absorption rate at 23° C.×65% RH was measured according to the Karl Fischer method of JIS K-6810.

Charpy impact strength: measured according to ISO179/1eA (with notch).

Taber abrasion loss: measured with a taper abrasion tester (manufactured by Toyo Seiki Seisakusho Co., Ltd.) in accordance with JIS K 7204 (abrasion wheel: CS17, load: 1000 g, rotation speed: 1000 rpm).

Weld bending strength: Using an injection molding machine (IS-100 manufactured by Toshiba Machine Co., Ltd.), a cylinder temperature was set to 280° C. (320° C. in Example 9 and 240° C. in Comparative Example 4). An ISO dumbbell molded article having a weld at its center was obtained under the condition of a mold temperature of 90° C. for measurement according to ISO178.

Mold releasability: Using an injection molding machine EC-100 manufactured by Toshiba Machine Co., Ltd., a cylinder temperature was set to 280° C. (320° C. in Example 9 and 240° C. in Comparative Example 4), and a mold temperature was set to 90° C. Injection molding was performed using a flat plate making die having a film gate and having a length of 100 mm, a width of 100 mm, and a thickness of 1 mm. Molding was performed at an injection speed of 50 mm/sec, a holding pressure of 30 MPa, an injection time of 10 seconds, and a cooling time of 10 seconds, and the quality of moldability was evaluated according to the following criteria.

Good: Molded articles can be obtained without any problem.

Average: Sprue sometimes remains in the mold.

Poor: The releasability is insufficient, and the molded articles stick to the mold or are deformed.

TABLE 1

| | | Unit | Example 1 | Example 2 | Example 3 | Example 4 | Example 5 |
|---|---|---|---|---|---|---|---|
| Composition | (A1) Polyamide 66 (RV2.0) | Parts by mass | | | | | |
| | (A2) Polyamide 66 (RV2.7) | Parts by mass | 100 | 100 | 100 | 100 | 100 |
| | (A3) Polyamide 66 (RV3.5) | Parts by mass | | | | | |
| | (A4) Polyamide 6T/6 (RV2.6) | Parts by mass | | | | | |
| | (A5) Polyamide 6 (RV2.5) | Parts by mass | | | | | |
| | (B) Modified styrene-based copolymer | Parts by mass | 5.5 | 5.5 | 5.5 | 3.5 | 7.5 |
| | (C) Modified high-density polyethylene | Parts by mass | 3.0 | 0.7 | 4.5 | 0.7 | 4.5 |
| | (D1) Aliphatic metal salt | Parts by mass | 0.7 | 0.7 | 0.7 | 0.7 | 0.7 |
| | (D2) Aliphatic metal salt | Parts by mass | | | | | |
| | (E) Wollastonite | Parts by mass | | | | | |
| Composition Characteristics | Equivalent concentration A of carboxy group | meq/kg | 81 | 82 | 81 | 81 | 82 |
| | Equivalent concentration Z of metal ion derived from component (D) | meq/kg | 21.7 | 22.1 | 21.4 | 22.6 | 21.0 |
| | A/Z | — | 3.7 | 3.7 | 3.8 | 3.6 | 3.9 |
| Evaluation results of physical characteristics | MFR | g/10 min | 43 | 48 | 37 | 54 | 30 |
| | MFR standard deviation | g/10 min | 2.5 | 2.7 | 2.3 | 2.9 | 1.8 |
| | 65% RH equilibrium water absorption rate | % | 2.4 | 2.5 | 2.3 | 2.6 | 2.2 |
| | Charpy impact strength | kJ/m$^2$ | 12.0 | 11.0 | 12.6 | 10.2 | 13.1 |
| | Taber abrasion loss | mg | 5.5 | 6.5 | 5.5 | 6.5 | 6.0 |
| | Weld bending strength | MPa | 38 | 36 | 41 | 34 | 35 |
| | Mold releasability | — | Good | Good | Good | Good | Good |

| | | Unit | Example 6 | Example 7 | Example 8 | Example 9 |
|---|---|---|---|---|---|---|
| Composition | (A1) Polyamide 66 (RV2.0) | Parts by mass | | | | |
| | (A2) Polyamide 66 (RV2.7) | Parts by mass | 100 | 100 | 100 | |
| | (A3) Polyamide 66 (RV3.5) | Parts by mass | | | | |
| | (A4) Polyamide 6T/6 (RV2.6) | Parts by mass | | | | 100 |
| | (A5) Polyamide 6 (RV2.5) | Parts by mass | | | | |
| | (B) Modified styrene-based copolymer | Parts by mass | 7.5 | 3.5 | 5.5 | 5.5 |
| | (C) Modified high-density polyethylene | Parts by mass | 4.5 | 3.0 | 3.0 | 3.0 |
| | (D1) Aliphatic metal salt | Parts by mass | 0.05 | 1.5 | | 0.7 |
| | (D2) Aliphatic metal salt | Parts by mass | | | 0.7 | |
| | (E) Wollastonite | Parts by mass | | | | |
| Composition Characteristics | Equivalent concentration A of carboxy group | meq/kg | 82 | 81 | 81 | 86 |
| | Equivalent concentration Z of metal ion derived from component (D) | meq/kg | 1.5 | 47.0 | 14.4 | 21.7 |
| | A/Z | — | 54.7 | 1.7 | 5.6 | 4.0 |
| Evaluation results of physical characteristics | MFR | g/10 min | 24 | 58 | 40 | 43 |
| | MFR standard deviation | g/10 min | 2.0 | 14.0 | 2.5 | 2.3 |
| | 65% RH equilibrium water absorption rate | % | 2.3 | 2.4 | 2.4 | 1.9 |
| | Charpy impact strength | KJ/m$^2$ | 12.9 | 9.5 | 12.0 | 13.5 |
| | Taber abrasion loss | mg | 6.2 | 6.8 | 5.5 | 5.0 |
| | Weld bending strength | MPa | 35 | 31 | 38 | 43 |
| | Mold releasability | — | Good | Good | Good | Good |

TABLE 2

|  |  | Unit | Comparative Example 1 | Comparative Example 2 | Comparative Example 3 | Comparative Example 4 | Comparative Example 5 |
|---|---|---|---|---|---|---|---|
| Composition | (A1) Polyamide 66 (RV2.0) | Parts by mass | 100 | | | | |
| | (A2) Polyamide 66 (RV2.7) | Parts by mass | | | | 100 | 100 |
| | (A3) Polyamide 66 (RV3.5) | Parts by mass | | 100 | | | |
| | (A4) Polyamide 6T/6 (RV2.6) | Parts by mass | | | | | |
| | (A5) Polyamide 6 (RV2.5) | Parts by mass | | | 100 | | |
| | (B) Modified styrene-based copolymer | Parts by mass | 5.5 | 7.5 | 5.5 | 5.5 | 3.5 |
| | (C) Modified high-density polyethylene | Parts by mass | 3.0 | 3.0 | 3.0 | 3.0 | 0.7 |
| | (D1) Aliphatic metal salt | Parts by mass | 0.7 | 0.7 | 0.7 | 0.7 | 1.8 |
| | (D2) Aliphatic metal salt | Parts by mass | | | | | |
| | (E) Wollastonite | Parts by mass | | | | 10.0 | |
| Composition Characteristics | Equivalent concentration A of carboxy group | meq/kg | 118 | 54 | 76 | 81 | 81 |
| | Equivalent concentration Z of metal ion derived from component (D) | meq/kg | 21.7 | 21.3 | 21.7 | 19.9 | 57.4 |
| | A/Z | — | 5.4 | 2.5 | 3.5 | 4.1 | 1.4 |
| Evaluation results of physical characteristics | MFR | g/10 min | 65 | 12 | 45 | 16 | 69 |
| | MFR standard deviation | g/10 min | 6.0 | 1.2 | 2.6 | 2.2 | 19.0 |
| | 65% RH equilibrium water absorption rate | % | 2.5 | 2.3 | 3.4 | 2.1 | 2.4 |
| | Charpy impact strength | kJ/m$^2$ | 5.9 | 15.0 | 10.5 | 9.3 | 7.1 |
| | Taber abrasion loss | mg | 8.5 | 4.0 | 10.3 | 10.6 | 9.0 |
| | Weld bending strength | MPa | 30 | 24 | 29 | 20 | 32 |
| | Mold releasability | — | Good | Good | Good | Good | Good |

|  |  | Unit | Comparative Example 6 | Comparative Example 7 | Comparative Example 8 | Comparative Example 9 |
|---|---|---|---|---|---|---|
| Composition | (A1) Polyamide 66 (RV2.0) | Parts by mass | | | | |
| | (A2) Polyamide 66 (RV2.7) | Parts by mass | 100 | 100 | 100 | 100 |
| | (A3) Polyamide 66 (RV3.5) | Parts by mass | | | | |
| | (A4) Polyamide 6T/6 (RV2.6) | Parts by mass | | | | |
| | (A5) Polyamide 6 (RV2.5) | Parts by mass | | | | |
| | (B) Modified styrene-based copolymer | Parts by mass | 5.5 | 5.5 | 5.5 | |
| | (C) Modified high-density polyethylene | Parts by mass | 3.0 | 3.0 | | 3.0 |
| | (D1) Aliphatic metal salt | Parts by mass | 0.04 | | 0.5 | 0.15 |
| | (D2) Aliphatic metal salt | Parts by mass | | | | |
| | (E) Wollastonite | Parts by mass | | | | |
| Composition Characteristics | Equivalent concentration A of carboxy group | meq/kg | 81 | 81 | 82 | 79 |
| | Equivalent concentration Z of metal ion derived from component (D) | meq/kg | 1.25 | — | 16.0 | 4.9 |
| | A/Z | — | 64.8 | — | 5.1 | 16.1 |
| Evaluation results of physical characteristics | MFR | g/10 min | 32 | 31 | 49 | 63 |
| | MFR standard deviation | g/10 min | 1.7 | 1.7 | 2.7 | 4.5 |
| | 65% RH equilibrium water absorption rate | % | 2.4 | 2.4 | 2.6 | 2.6 |
| | Charpy impact strength | KJ/m$^2$ | 12.0 | 12.0 | 10.0 | 4.5 |
| | Taber abrasion loss | mg | 5.1 | 5.5 | 44.0 | 7.3 |
| | Weld bending strength | MPa | 38 | 38 | 34 | 31 |
| | Mold releasability | — | Poor | Poor | Good | Good |

In Examples 1 to 9, by controlling the MFR and the 65% RH equilibrium water absorption rate, high flow characteristics and excellent abrasion resistance with a taber abrasion loss of 8 mg or less were obtained. By using the aliphatic metal salt (D), the mold releasability is improved, and high impact strength is maintained regardless of high fluidity. Meanwhile, in Comparative Example 1 in which the MFR was outside the upper limit, sufficient impact strength was not obtained, and in Comparative Example 2 in which the MFR was outside the lower limit, the fluidity was insufficient, whereby the weld bending strength was low. In Comparative Example 3 in which polyamide 6 was used and the 65% RH equilibrium water absorption rate was high, the abrasion resistance was low. In Comparative Example 4 using wollastonite, the fluidity was low, and the abrasion resistance was also relatively low. In Comparative Examples 6 and 7 in which the amount of the aliphatic metal salt (D) was less than 0.05 parts by mass, or the aliphatic metal salt (D) was not contained, the mold releasability was poor. In Example 7 in which A/Z was close to the preferable lower limit value, the MFR began to fluctuate. In Comparative Example 5 in which A/Z was outside the preferable lower limit value and the MFR was outside the upper limit value, the impact strength and the abrasion resistance were greatly reduced. In Comparative Example 8, the abrasion resistance was not improved because the modified high-density polyethylene (C) was not contained. In Comparative Example 9, the impact resistance was extremely lowered because the modified styrene-based copolymer (B) was not contained.

INDUSTRIAL APPLICABILITY

The polyamide resin composition of the present invention is used as a raw material for a polyamide resin molded article (for example, a sliding component or the like) having a low sliding friction coefficient, a low abrasion loss due to the surface roughness, and a small deterioration in performance due to repeated fatigue. The polyamide resin composition of the present invention is particularly suitable for mechanical components such as door checkers and gears for automobiles which require sliding characteristics.

The invention claimed is:

1. A polyamide resin composition comprising 3 to 9 parts by mass of a modified styrene-based copolymer (B), 0.5 to 5 parts by mass of a modified high-density polyethylene (C), and 0.05 to 1.5 parts by mass of an aliphatic metal salt (D) with respect to 100 parts by mass of a polyamide resin (A), and having a melt mass flow rate (MFR) of 20 g/10 minutes or more and less than 60 g/10 minutes and a 65% RH equilibrium water absorption rate of less than 3%, wherein the aliphatic metal salt (D) is selected from the group consisting of a montanic acid metal salt, a behenic acid metal salt, aluminum stearate, and magnesium stearate,
the polyamide resin composition does not comprise a wollastonite,
the modified styrene-based copolymer (B) is at least one kind of modified styrene-type thermoplastic elastomer selected from the group consisting of a block copolymer of styrene/butadiene/styrene (SBS), a block copolymer of styrene/isoprene/styrene (SIS), a block copolymer of styrene/ethylene•butylene/styrene (SEBS), a block copolymer of styrene/ethylene•propylene/styrene (SEPS), and a block copolymer of styrene/ethylene•amylene/styrene (vinyl SEPS), having at least one kind of reactive functional group selected from the group consisting of a carboxy group, an acid anhydride group, an epoxy group, an oxazoline group, an amino group, and an isocyanate group,
the modified high-density polyethylene (C) is a modified high-density polyethylene having at least one kind of reactive functional group selected from the group consisting of a carboxy group, an acid anhydride group, an epoxy group, an oxazoline group, an amino group, and an isocyanate group.

2. The polyamide resin composition according to claim 1, wherein an equivalent concentration A (meq/kg) of a carboxy group of the polyamide resin (A) in the polyamide resin composition and an equivalent concentration Z (meq/kg) of a metal ion derived from the aliphatic metal salt (D) in the polyamide resin composition satisfy the following formula (1):

$$1.5 \leq A/Z \leq 55 \tag{1}$$

3. The polyamide resin composition according to claim 1, wherein the polyamide resin (A) contains at least polyamide 66.

4. The polyamide resin composition according to claim 1, wherein
the modified styrene-based copolymer (B) is a modified styrene-based copolymer modified with an unsaturated carboxylic acid and/or an unsaturated dicarboxylic acid anhydride, and
the modified high-density polyethylene (C) is a modified high-density polyethylene modified with an unsaturated carboxylic acid and/or an unsaturated dicarboxylic acid anhydride.

5. A polyamide resin molded article obtained from the polyamide resin composition according to claim 1.

* * * * *